United States Patent [19]

Ambrose et al.

[11] Patent Number: 4,797,518
[45] Date of Patent: Jan. 10, 1989

[54] BRAKING INDICATOR

[76] Inventors: Stephen D. Ambrose, 2 Washington St., Rocky Hill, N.J. 08553; Jeffrey W. Tunkel, 4667 Willow Grove Dr., Ellicott City, Md. 21043; Joseph F. Shelley, 54 Talbot La., Princeton, N.J. 08540

[21] Appl. No.: 126,571

[22] Filed: Nov. 30, 1987

[51] Int. Cl.4 .................. H01H 3/14; H01H 35/24; B60Q 1/00
[52] U.S. Cl. .................. 200/61.89; 200/81 R
[58] Field of Search .................. 200/61.89, 86.5, 82 B, 200/82 D, 83 N, 81 H, 157, 81 R; 340/52 R, 52 C, 69, 71, 72

[56] References Cited

U.S. PATENT DOCUMENTS

| 1,882,259 | 10/1932 | Rockwell | 200/83 N |
| 2,674,669 | 4/1954 | Leedam | 200/86.5 |
| 3,111,721 | 11/1963 | Montague, Jr. | 200/86.5 X |
| 3,939,316 | 2/1976 | Stropkuy | 340/69 X |
| 3,958,677 | 5/1976 | Spanelis | 200/61.89 X |
| 4,109,118 | 8/1978 | Kley | 200/5 E |
| 4,404,439 | 9/1983 | Leighton | 200/61.89 |
| 4,439,650 | 3/1984 | Brown | 200/61.89 |
| 4,558,194 | 12/1985 | Wiblin | 200/61.89 |

FOREIGN PATENT DOCUMENTS 43-16687  7/1968  Japan .................. 200/86.5

*Primary Examiner*—J. R. Scott
*Attorney, Agent, or Firm*—Indyk, Pojunas & Brady

[57] ABSTRACT

A fluid responsive switching mechanism is located on a brake actuator in a vehicle to signal impending brake actuation as quickly as possible to reduce the risk of accidents such as rear end collisions. Direct contact with the brake actuator by the driver to initiate brake actuation causes the fluid responsive switching mechanism to immediately energize brake indicators upon such contact. In one example of the invention, an electric switch is located inside a fluid filled chamber located on a brake pedal in the vehicle. In a second example of the invention, an electric switch is located outside such fluid filled chamber.

14 Claims, 3 Drawing Sheets

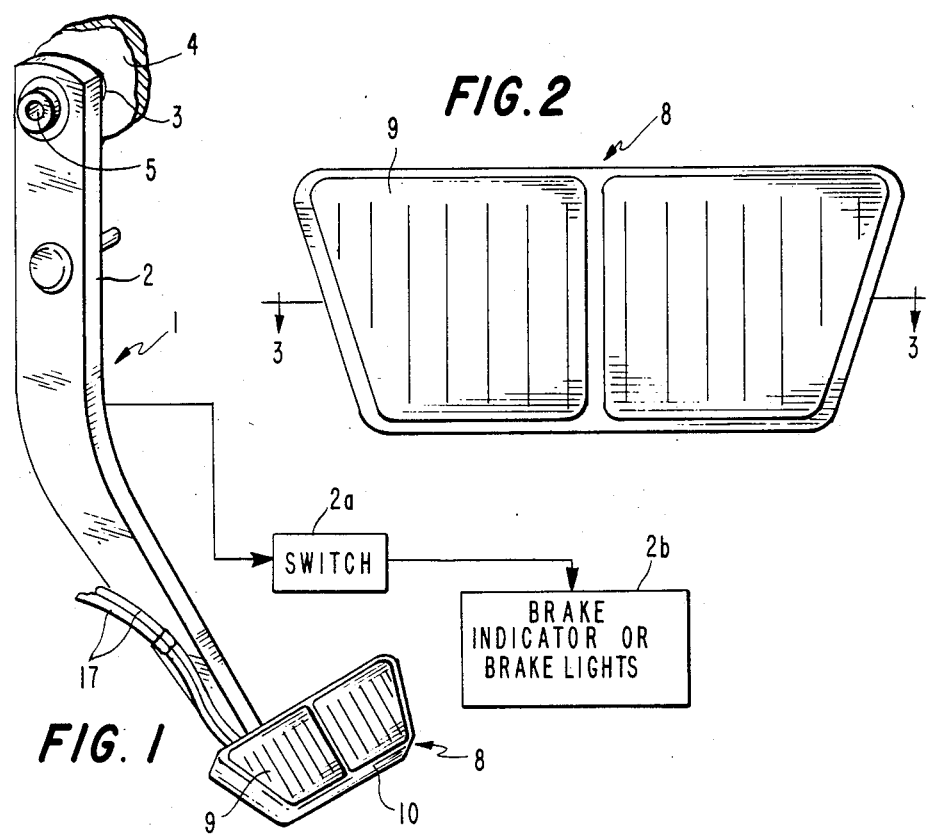
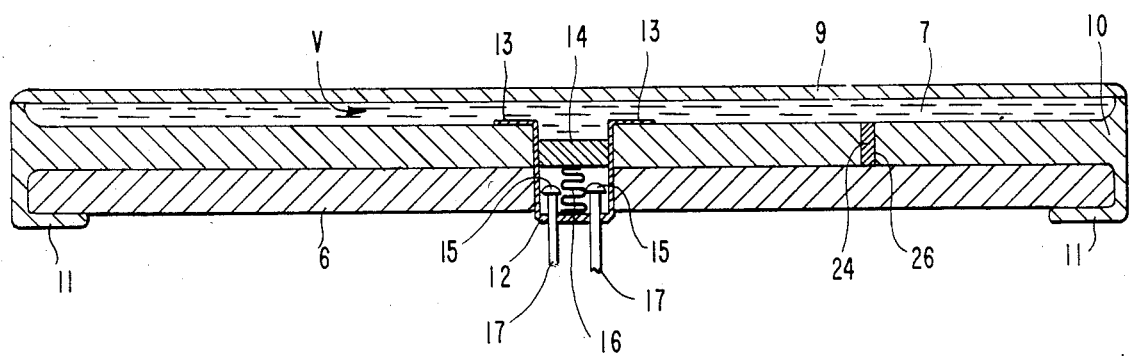

BRAKING INDICATOR

FIELD OF THE INVENTION

This invention relates to vehicular braking indicators. More particularly, the invention relates to vehicular braking indicators which signal impending vehicular braking more rapidly and more reliably than prior braking indicators.

BACKGROUND OF THE INVENTION

In a vehicle such as an automobile or truck, it is very important that some means of signalling be provided to indicate when the brakes on the vehicle are being actuated to alert drivers behind the vehicle that it is about to stop. In most instances, this is accomplished by a pair of brake lights attached to the rear of the vehicle. Each light of the pair is spaced vertically a predetermined distance from the ground so that it is easily visible to drivers in back of the vehicle. Usually, each light is located a predetermined horizontal distance on either side of a longitudinl plane of symmetry passing through the vehicle. Recently, it has been common for a third brake light to be positioned between the pair of brake lights described above. Generally, that third brake light is positioned farther away from the ground than the other two. It is generally felt that such a third brake light provides a greater warning of vehicular braking.

Brakes on a vehicle are usually actuated by the depression of a brake pedal on the floor of the driver's compartment. The brake pedal is attached to a lever which rotates about a pivot point in response to a depression of the pedal by the driver. Rotation of the lever about the pivot point causes the brakes to be actuated. An electrical switch is also actuated by the rotation of the lever. The switch connects a source of electrical energy to the brake lights when the brake pedal is depressed.

There is a significant problem with such an arrangement in that it takes a significant amount of time for the brake lights to be actuated once the driver touches the brake pedal. This time delay is caused by the amount of mechanical motion that the lever associated with the brake pedal must undergo in order for the electrical switch to be closed. In this situation, drivers in the rear of the vehicle would not be apprised of the braking of the vehicle as soon as they might and unnecessary rear end collisions may result.

There have been attempts to solve this problem in the past. U.S. Pat. Nos. 1,882,259, 2,674,669, 3,939,316, 4,404,439, and 4,439,650 all refer to efforts to solve the problem of time delays between the actuation of a brake pedal and the actuation of brake lights. These efforts have been unsatisfactory because they are mechanically complex, they require too much time between touching the brake pedal and actuation of the brake lights, and they are unreliable in terms of positive and definite brake light actuation every time the brake pedal is touched.

The invention of this application solves the problems of the prior art and satisfies the long felt need for a braking indicator which is fast acting, reliable, simple, and inexpensive.

SUMMARY OF THE INVENTION

It is an object of the invention to provide a braking indicator which signals braking of a vehicle as soon as possible.

It is an additional object of the invention to provide a braking indicator which signals impending braking before actual brake actuation.

It is yet an additional object of the invention to provide a braking indicator which is simple and economical to make.

It is another object of the invention to provide a braking indicator which is reliably actuated every time the brake pedal or other brake actuator in a vehicle is touched.

Other objects and advantages are either specifically described elsewhere in this application, or are apparent from the description in this application.

In accordance with the objects of the invention, a fluid actuated switching mechanism is provided for energizing one or more braking indicators on a vehicle.

BRIEF DESCRIPTION OF THE DRAWINGS

FIG. 1 shows a perspective view of an example of a brake pedal assembly in accordance with the invention of this application.

FIG. 2 is a top view of the brake pedal pad of FIG. 1.

FIG. 3 is a cross sectional view of the brake pad of FIG. 2 taken along line 3—3.

DETAILED DESCRIPTION OF THE INVENTION

Figure 4:
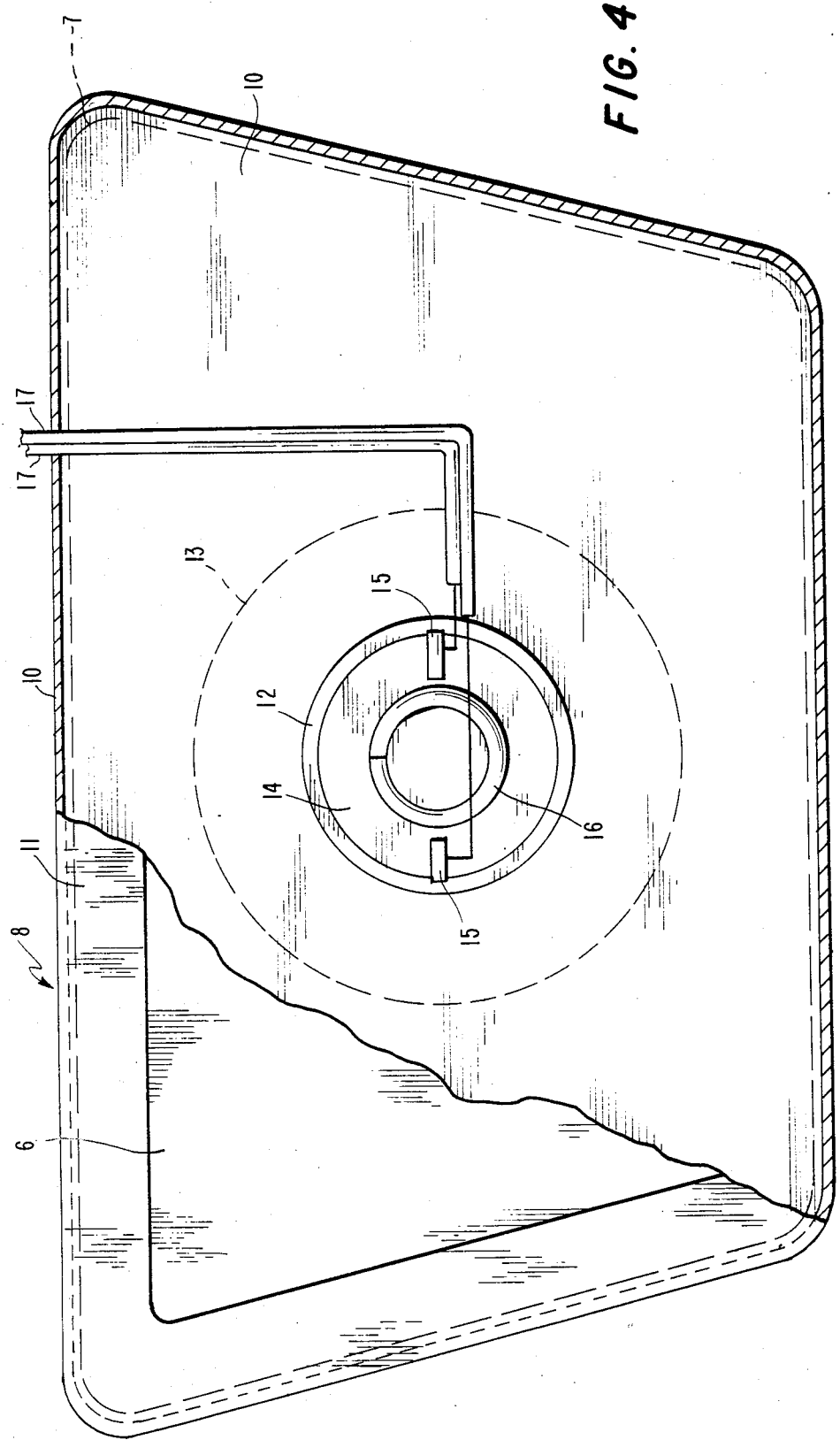
FIG. 4 is is a partially cut away view of the bottom of the brake pedal pad of FIG. 2.

FIGS. 1-5 ilustrate a first example of the invention of this application. Those Figures show an automotive brake pedal assembly 1 which actuates the vehicle's braking system when the pedal assembly is depressed by the foot of the driver. The brake pedal assembly includes a rigid arm 2 connected at one end to a stationary pivot pin 5 which is inserted in a bushing 3 in the firewall 4 of the vehicle. A pedal plate assembly generally indicated by reference numeral 8 is situated at the other end of the brake pedal assembly. It comprises a flat and rigid brake pedal plate 6, as shown in FIG. 3, which provides a relatively large surface area to facilitate brake actuation by the foot of the driver. The pedal plate is covered with a flexible pedal pad 10, which has a surface 9 which is directly contacted by the foot of the driver when he or she desires to brake the vehicle. The pedal pad is secured to the pedal plate by means of an extension 11 which wraps around the plate as shown in FIG. 3.

The brakes of the vehicle may be actuated by the driver contacting the surface 9 and applying a force to the pedal assembly to rotate the arm about pivot pin 5. At a predetermined point in the rotation of the arm about pivot pin 5, the braking system of the vehicle is actuated in any known manner. In the past, at a predetermined point in the rotation of the arm, an electrical switch 2a was closed and the brake lights 2b in the rear of the vehicle were actuated. This involved a significant amount of time after the brake pedal was touched by the driver which meant that drivers in the rear of the vehicle were not warned of vehicle braking as soon as they might have been warned. As described below, the invention of this application decreases the amount of time between the point at which the vehicle operator decides to apply the brakes and the point at which the braking indicators on the vehicle are energized.

This is accomplished by the provision of a fluid filled chamber or bladder 7 inside the pedal cover 10 containing a volume V of preferably a substantially incompressible fluid and being sealed in any generally known manner to prevent leakage of the fluid from the chamber. The fluid may be admitted to the chamber through a hole 26, which is then sealed with a plug 24. The fluid in the chamber contacts a circular electrically conductive plunger 14 located approximately in the center of the pedal pad assembly. In response to downward force applied by the fluid, the plunger slides in a non-conductive cylinder 12 against the force of a spring 16 seated at the bottom to the cylinder. The cylinder is attached to the interior of the chamber by means of a flared portion 13. A predetermined amount of downward movement of the plunger causes it to bridge a pair of conductive members 15 to close an electrical circuit between a pair of conductors 17 which connects braking indicators on the vehicle in series with an electrical energy source. The places where the cylinder passes through the wall of the chamber and the wires pass through the cylinder are sealed to prevent leakage of fluid from the chamber.

When the driver of the vehicle desires to brake the vehicle, he presses on surface 9 with his foot. The nature of the surface 9 is such that a first amount of force is sufficient to deform it. Deformation of the surface 9 causes the fluid to bear downwardly against the plunger and spring to close the circuit between contact members 15 and actuate the braking indicators. The surface 9, fluid in the chamber, the dimensions of the cylinder and plunger, and the location of the contacts are arranged such that only a slight amount of force from the foot of the driver is sufficient to actuate the braking indicators in this manner. If a second force greater than the first force is applied to the pedal assembly, then the arm rotates about pivot pin 5 and actuates the brakes as has been done in the past.

An electromechanical switching mechanism such as switch 2a actuated by actual depression of the brake pedal may be provided in addition to the fluid responsive switching mechanism described above to provide redundancy. In a situation where a fluid responsive switching mechanism and an electromechanical switching mechanism are provided, it may be arranged for the fluid responsive switching mechanism to energize a predetermined subset of a plurality of braking indicators on the vehicle and for the electromechanical switching mechanism to energize another predetermined subset of the braking indicators, or all of them. For example, the fluid responsive switching mechanism may energize a brake light on an axis of symmetry in the rear of the vehicle. The electromechanical switching mechanism may energize only brake lights spaced from the axis of symetry, or all the brake lights, in the rear of the vehicle.

In the arrangement of FIGS. 1-5, the braking indicators are reliably and quickly actuated because the braking indicators are energized immediately upon contact of the driver's foot with the pedal assembly, the plunger is depressed regardless of the direction that force is applied to the surface 9, and there is a mechanical advantage between the motion of the surface 9 and the motion of the plunger 14. The dimensions of the cylinder in relation to the area of the surface 9 and the area of the driver's foot contacting surface 9 may be arranged such that only slight deformation of the surface is needed to close contact members 15. The smaller the cross sectional area of the cylinder is in relation to the areas of surface 9 and the driver's foot the larger the mechanical advantage will be between the motion of surface 9 and the motion of the plunger. Reducing the area of the cylinder in relation to the area of the surface and driver's foot will thus increase the sensitivity of the braking indicators. In addition to being reliable and sensitive, the braking indicators are positively deenergized when the driver's foot is removed from the pedal assembly because the spring returns the plunger to a position where it does not touch contact members 15. The braking indicators are, however, immediately actuated once the driver contacts the brake pedal giving drivers in other vehicles as much warning as possible of vehicle braking so that the risk of accidents is reduced.

Figure 6:
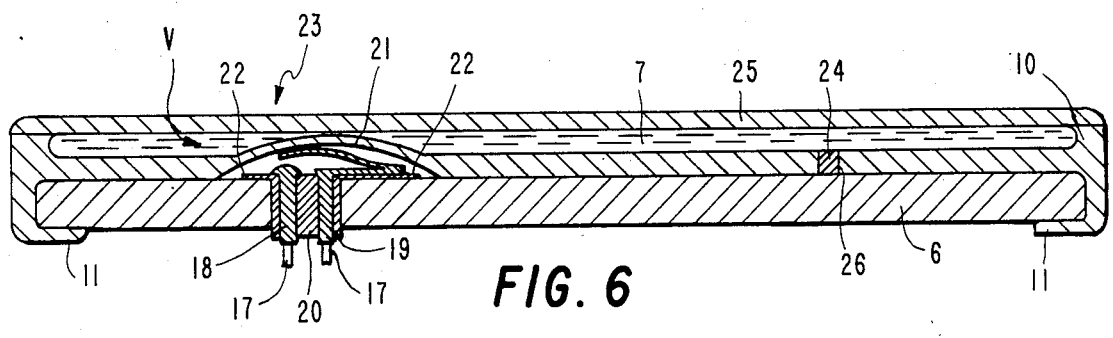
FIG. 6 is another example of the invention.
Figure 5:
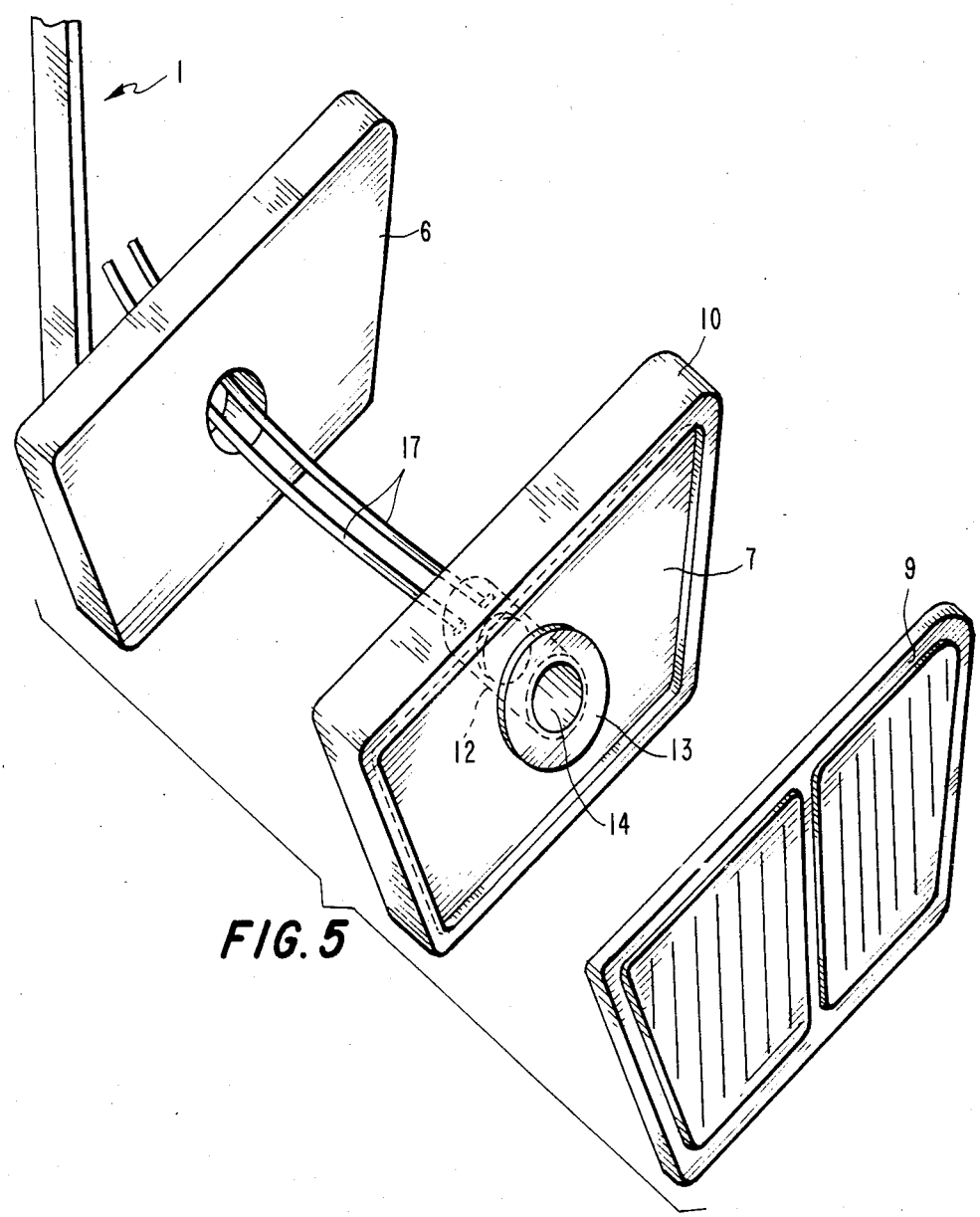
FIG. 5 is an exploded view of the pedal assembly of FIG. 1.

FIG. 6 shows another example of the invention. It includes a pedal plate 6 and a pedal cover 10 having a fluid filled chamber or bladder 7 as in the first example of the invention described above. The fluid is admitted to the chamber through a hole 26 which is then sealed with a plug 24. This example of the invention also includes a resilient raised portion 21, a conductive leaf spring 19 connected to one of a pair of conductors 17, and a conductive pin 18 connected to the other of the pair of conductors 17. The lower portion of the leaf spring and the conductive pin are embedded in a plug 20 passing through the pedal plate. A flared portion 22 of the plug 20 is attached to the pedal plate.

When force is applied to the surface 25 by the vehicle operator, it deforms and causes fluid to bear against the raised portion 21 which forces the leaf spring downwardly so that it makes contact with pin 18. When pin 18 is contacted by spring 19, an electrical series circuit is completed between the braking indicators and an energy source so that the braking indicators are energized. When the driver removes his foot from the surface, the resiliency of the spring causes the electrical circuit to the braking indicators to be broken.

The nature of the surface 25, chamber 7, raised portion 21, leaf spring 19, and pin 18 may be selected to provide the same advantages of reliability and sensitivity found in the first example of the invention. In addition, there is less likelihood of fluid leakage and contamination of the switching mechanism because the leaf spring and contact pin are outside the fluid filled chamber. The example of FIG. 6 may also include an electromechanical switching mechanism to provide redundancy and sequential actuation of selected braking indicators, as described above for the example of FIGS. 1-5.

We claim:
1. An apparatus for indicating vehicle braking, comprising:
   a means for actuating brakes of the vehicle;
   a flexible member located on the actuating means to be directly contacted by the driver of the vehicle when it is desired to brake the vehicle, such member being deformable in response to direct contact with the member by the driver of the vehicle; and
   a fluid pressure actuated switching means responsive to deformation of the member for energizing a braking indicator on the vehicle.

2. The apparatus of claim 1, in which the actuating means is a brake pedal and the flexible member is a surface on a pedal cover.

3. The apparatus of claim 2, in which the switching means comprises a fluid filled chamber, the volume of which is altered in response to deformation of the flexible member.

4. The apparatus of claim 3, in which the switching means further comprises an electrical switch responsive to an alteration in the volume of the fluid filled chamber.

5. The apparatus of claim 3, in which the fluid filled chamber comprises a fluid filled bladder.

6. The apparatus of claim 1, in which the braking indicator comprises a plurality of brake lights.

7. The apparatus of claim 1, in which the flexible member and switching means are arranged such that application of a first force to the actuating means by the vehicle operator is sufficient to deform the flexible member and actuate the switching means; and in which the actuating means is arranged such that application of a second force to the actuating means by the vehicle operator causes mechanical motion of the actuating means which results in the brakes being actuated, the first force being less than the second force.

8. The apparatus of claim 7, in which the first force is insufficient to cause mechanical motion of the actuating means.

9. The apparatus of claim 1, in which the actuating means, the flexible member, and the switching means are arranged such that the switching means is actuated first followed by actuation of the brakes when the vehicle operator contacts the flexible member.

10. The apparatus of claim 7, in which the actuating means, the flexible member, and the switching means are arranged such that the switching means is actuated first followed by actuation of the brakes when the vehicle operator contacts the flexible member.

11. The apparatus of claim 1, in which the flexible member and the switching means are arranged such that the switching means is actuated regardless of the direction of force applied to the flexible member by the vehicle operator when it is desired to brake the vehicle.

12. The apparatus of claim 6, in which the switching means is capable of energizing first predetermined ones of the brake lights.

13. The apparatus of claim 12, further comprising another switching means responsive to the brake actuating means for energizing second predetermined ones of the brake lights.

14. The apparatus of claim 13, in which the first predetermined brake lights comprise a brake light on the plane of symmetry of the vehicle and the second predetermined brake lights comprise brake lights spaced from the plane of symmetry of the vehicle.

* * * * *